May 2, 1961  E. E. HOOD  2,982,384
SEMI-AUTOMATIC TWO-SPEED HUB AND COASTER BRAKE
Filed July 18, 1960
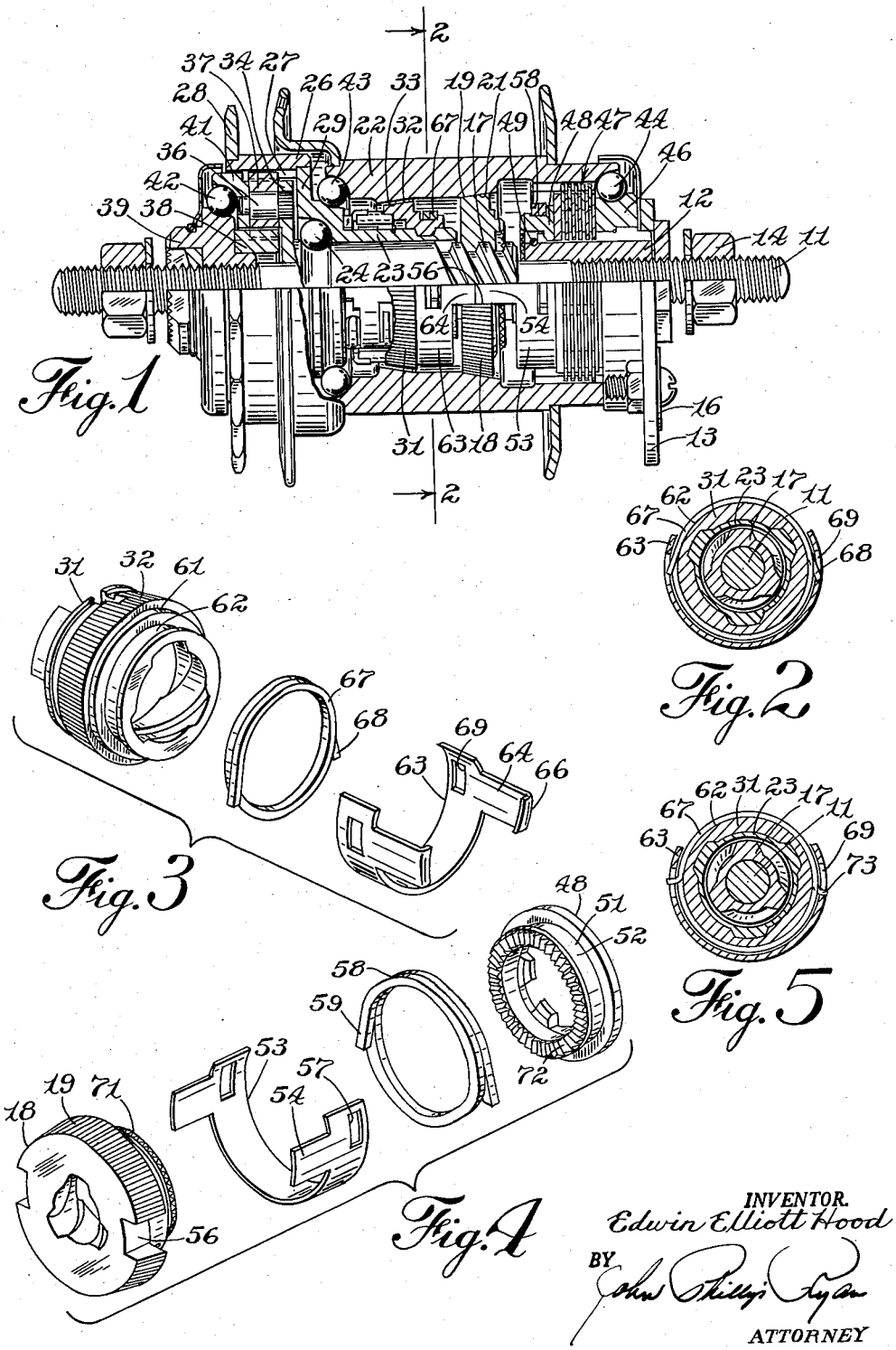
INVENTOR.
Edwin Elliott Hood
BY
ATTORNEY

United States Patent Office 2,982,384
Patented May 2, 1961

2,982,384

SEMI-AUTOMATIC TWO-SPEED HUB AND COASTER BRAKE

Edwin Elliott Hood, Elmira, N.Y., assignor to The Bendix Corporation, Elmira Heights, N.Y., a corporation of Delaware Filed July 18, 1960, Ser. No. 43,368

15 Claims. (Cl. 192—6)

The present invention relates to a semi-automatic two-speed hub and coaster brake for velocipedes and the like, and more particularly relates to that type in which the shift from one gear or speed to the other is brought about by a slight backward rotation of the driving member.

In devices of this type the retardation of the various cooperating elements has been obtained in the past by the use of a chain of frictional retarder means having radially biased wiping spring arms. Each of these retarder means necessarily differs in its torque transferring capabilities. In the Gleasman Patent 2,882,754, issued April 21, 1959, there is illustrated the common retarder means presently used in devices of this type. As a general rule there is a first frictional retarder element which is fixed to either the low speed clutch nut and/or the braking elements. This first retarder is required to have the highest torque transmitting capabilities and either directly or indirectly, this first retarder means is secured to a fixed element such as the axle. Rotation of the low speed screw shaft will cause the low speed clutch nut to be retarded and, consequently, threaded upon forward rotation of the screw shaft into engagement with the clutching surface of the hub and upon retrograde rotation of the shaft into engagement with braking means. A second frictional retarder is connected either to the high speed clutch nut or the low speed clutch nut and engages the other of these clutch nuts. The torque carrying capacities of the second retarder must be sufficient to cause the high speed clutch nut to be threaded upon the high speed screw shaft upon rotation of that shaft, but the retardation forces of this second retarder must not equal or exceed those exerted between the first retarder and its fixed element. In some present day devices, as illustrated in the Hood Patent 2,865,478, issued December 23, 1958, still other retarder elements are used to control selector and indexing mechanisms. These other retarders are generally coupled to the high speed clutch nut and exert retarding forces upon the selector and indexing mechanisms. Again the torque transferring capabilities of these other retarders must not equal or exceed the force exerted by any preceding retarders. Additionally, the functions served by these chain frictional retarders must be accomplished in either direction of rotation since the screw shafts and their clutch nuts are subject to rotation in either direction.

The prior art retarders, as illustrated in the mentioned patents, have been provided by biased spring fingers frictionally wiping on some portion of the cooperating elements. Each of these retarders is physically different due to the fact that each must possess varying torque transferring capabilities or meet varying torque requirements. The spring biased finger type of retarders have the added drawback in that there is considerable variation in their break-away and running torque capacities. Tests have shown that it is desirable to have the retarders exert a break-away and a running or sliding torque capacity which are substantially identical. Another drawback to the finger type of frictional retarder is the fact that the finger generally is established with a point contact against the cooperating element. This point contact provides an initial high unit resistance for the degree of bias, however, wear reduces the point of contact thus enlarging the area of contact on the spring finger and this results in a lower unit resistance pressure. In order to compensate for this wear, it has been necessary to provide excess resistance initially with the hope that as wear occurs the resistance will diminish to the ideal value.

While the spring biased type of retarder is a unitary element and does not require the use of an additional element or coupling member, it is nonetheless extremely expensive to manufacture. In addition to its manufacturing cost, it is also difficult to manufacture it with any degree of quality control.

It has been found that wrap-down spring retarders provide substantially identical break-away and running torque values and that they are subject to little or negligible changes due to wear thereby providing a substantially constant frictional or retardation force during the entire life of the device. Because wrap-down spring retarders are not subject to appreciable wear changes, these retarders can be initially set for the minimum required torque value and this value will be maintained during the active life of the device. The wrap-down spring type of retarders have the added beneficial feature in that they provide identical torque values in either direction of rotation. While wrap-down spring retarders do require an additional element such as a coupler, the overall cost is considerably less than that of the spring biased finger type of frictional retarder and the manufacturing quality control aspects are much more easily attained and maintained.

It is an object of the present invention to provide a semi-automatic two-speed hub and coaster brake which is efficient and reliable in operation, compact and durable as well as simple and economical in construction.

It is another object to provide a semi-automatic hub and coaster brake utilizing wrap-down spring frictional retarders.

It is still another object to provide a velocipede hub and coaster brake utilizing and incorporating wrap-down spring type frictional retarders which are subject to little or no wear over the normal life expectancy of the hub thus allowing the use of the retarder means which can be initially set to meet the minimum torque value requirements.

A further object is to provide wrap-down spring type frictional retarders that are bi-directional in operation.

It is still a further object to provide a bicycle hub and coaster brake incorporating wrap-down spring type of frictional retarders which provide break-away and running or sliding torque values which are of substantially equal value and with the torque value maintainable in either direction of operation.

It is still a further object to provide wrap-down spring type of frictional retarders for bicycle hubs and coaster brakes in which the frictional value or torque carrying capacities of the retarders are reduced by an unwinding action of a coupling means.

A related object is to provide coupler means to actuate the wrap-down spring type of retarder regardless of the direction of rotation.

It is still another related object to provide a coupler which has a lost motion connection with the wrap-down spring frictional retarder to prevent a wind-down of the spring retarder upon actuation by the coupler.

An ancillary object is to provide a retarder and coupler means that will provide anti-brake locking features which prevent brake lockup during driving engagement of one of the driving clutch nut members with the hub.

The foregoing and other objects and advantages of the invention will appear more fully from consideration of the detailed description which follows in conjunction with the accompanying drawing wherein one embodiment of the invention and a modification thereof are illustrated. It is to be expressly understood, however, that the drawing is for the purpose of illustration and description and is not to be construed as defining the limits of the invention.

The following description is taken in connection and conjunction with the accompanying drawing in which:

Figure 1 is a front elevation, partly broken away and in section, of a preferred embodiment of the invention;

Figure 2 is a fragmentary sectional view taken substantially on the plane of line 2—2 of Figure 1;

Figure 3 is an exploded perspective of the high speed clutch nut, the second or high speed coupling member and the high speed wrap-down spring retarder;

Figure 4 is an exploded perspective of the brake pressure ring, the low speed clutch nut, the low speed retarder and the low speed wrap-down spring retarder member; and Figure 5 is a fragmentary sectional detail view similar to Figure 2 of a second embodiment of the invention.

In Figure 1 of the drawing there is illustrated a stationary axle 11 adapted to be mounted in the rear fork of a bicycle or the like. A brake anchor sleeve 12 is threaded on the axle and held from rotation by an anchor arm 13 non-rotatably mounted and retained thereon by a clamping nut 14. The anchor arm is prevented from rotation by a clip 16 adapted to be attached to the frame of the vehicle in any conventional and convenient manner.

A low speed screw shaft 17 is rotatably mounted on the axle 11 and has a low speed clutch nut 18 threaded thereon having a conical clutch surface 19 adapted to be moved into and out of clutching engagement with a conforming clutch surface 21 formed on the interior of the hub 22.

A high speed screw shaft 23 is rotatably mounted on the low speed screw shaft 17 by means of a bearing 24. A driving member 26 incorporating an orbit gear 27 has a sprocket 28 fixedly mounted thereon in any suitable manner and is united with the high speed screw shaft 23 by a ring member 29 rigidly connected thereto and mounted on the adjacent end of the high speed screw shaft by suitable means such as brazing. A high speed clutch nut 31 is threaded on the high speed screw shaft 23 and has a conical clutch surface 32 adapted to be moved into and out of clutching engagement with a conforming clutch surface 33 in the interior of the hub 22.

A planet carrier ring 34 is fixedly mounted on the end of the low speed screw shaft 17 and has a plurality of pintles 36 fixedly mounted therein serving as bearings for planet pinions 37 which engage in the orbit gear 27. The pinions also mesh with a sun gear 38 rigidly mounted on the stationary bearing cone member 39 which is threaded on the axle 11. A bearing cup member 41 receives and supports the ends of the pintles 36 and is rotatably mounted on the cone member 39 by means of a bearing 42.

The hub 22 is rotatably supported by means of bearings 43, 44 journalled in races formed on the high speed screw shaft 23 and in a bearing cone 46, respectively. The bearing cone member 46 is fixedly mounted on the anchor sleeve 12.

Brake discs, generally indicated at 47, are splined alternately to the hub 22 and the anchor sleeve 12 and are arranged to be pressed together against the bearing cone 46 by means of a brake pressure ring 48 also splined on the anchor sleeve 12 and loosely retained thereon by a lock ring 49.

The brake pressure ring 48 is provided with an axially extending pilot portion 51 in which there is provided a circumferential groove or track 52. A low speed coupling member 53 is rotatably journalled on the pilot portion 51 and has axially extending arms 54 engaging in slots 56 in the periphery of the low speed clutch nut 18 so as to form a splined connection therewith. The low speed coupling member is formed with a pair of circumferentially spaced apertures 57. A low speed helically coiled wrap-down spring frictional retarder 58 is contractively and frictionally journalled in the track 52 and has its tangentially oppositely extending extremities 59 engageable with the apertures 57 in the low speed coupling member 53.

The high speed clutch nut 31 is provided with an axially extending pilot portion 61 in which is formed a track or circumferential groove 62. A high speed coupling member 63 is rotatably journalled on the pilot portion 61 and has axially extending arms 64 which engage in the slot 56 of the low speed clutch member intermediate the axial extending arms 54 of the low speed retarder 53 and the bottom of the low speed clutch nut slot 56. The arms 64 are provided with radially inturned lug members 66 to prevent or limit a hereinafter described axial separation between the high and low speed clutch nuts. A high speed helically coiled wrap-down spring frictional retarder 67 is contractively and frictionally journalled in the track 62 of the pilot portion 61. The extremities 68 of the spring 67 extend tangentially and oppositely from the circumferential body portion thereof to engage in circumferentially spaced apertures 69 of the high speed coupling member (Figure 2) and thereby provide a lost motion connection between the high speed retarder spring and the coupling member 63.

Secured to the high speed clutch nut opposite the pilot portion 61 is a selector and indexing mechanism which is alternatively operable to prevent the high speed clutch nut from drivingly engaging the hub 22. The structure of the selector and indexing mechanism constitutes no part of this invention and, consequently, will not be described in further detail. Reference is made to my copending application 50,770 filed August 19, 1960 which fully describes and claims the structure and operation of the selector and indexing mechanism.

In operation, starting with the parts in the position illustrated in Figure 1, forward rotation (which is clockwise when viewing the left-hand end of Figure 1) of the driving member 26 by the sprocket 28 is transmitted to the high speed screw shaft 23. Since the selector and abutment indexing mechanism are illustrated in abutting relation, the high speed clutch nut will be effectively prevented from drivingly engaging the hub. The low speed screw shaft 17 is concomitantly rotated by means of the planetary gearing 27, 37, 38 whereby the low speed clutch nut 18 is threadedly traversed into driving engagement with the hub clutch surface 21 and rotates the hub at the lower gear or speed. Traversal of the low speed clutch nut 18 on the low speed screw shaft 17 is caused by the low speed retarder 58. The low speed retarder 58 is frictionally journalled on the pilot portion 51 in the track 52 with the frictional engagement being of sufficient torque transmitting capacity to cause the low speed clutch nut to be restrained from rotating with its screw shaft. The low speed coupling member transfers the frictional torque values of the retarder 58 to the low speed clutch nut via the splined connection of arms 54 and slots 56. The high speed clutch nut 31 through its retarder 67 will be simultaneously caused to traverse the high speed screw shaft 23 but because of the abutting engagement between the selector mechanism and the abutment member, the clutch will be prevented from engaging the hub. The high speed retarder spring 67 which is frictionally journalled in the track 62 of the pilot portion 61 of the high speed clutch nut 31 will be caused to slip due to its being coupled to the low speed clutch nut. The reason for slippage results from an unwinding operation caused by the ends of the retarder extremities 68 abutting an end portion of the lost motion aperture 69 in the high speed coupling member 63 which is being driven at a slower rate by the low speed clutch nut. The abutting engagement between the extremity 68 and aperture 69 will cause an unwinding effect to take place in the helically coiled body of the high speed retarder 67 thereby diminishing the frictional engagement between the retarder and the track 62 allowing the high speed clutch nut to rotate relative to the low speed clutch nut member. The apertures 69 are of sufficient circumferential extent that there is no tendency for the aperture opposite the extremity-aperture engagement to wrap-down on its cooperating retarder extremity. In this manner undesirable friction creating wrap-down is effectively prevented. Once an engagement between the low speed clutch nut and hub clutch surface has been established the low speed coupler will be driven by the clutch nut in a manner to cause an aperture 57 to abut a low speed retarder extremity 59. This abutting engagement between the extremity 59 and coupler aperture 57 will cause an unwinding action to occur thereby diminishing the frictional engagement between the retarder 58 and the groove 52 allowing relative rotation between the low speed clutch nut and the brake pressure ring.

When it is desired to operate in high gear, the operator back pedals slightly thus rotating the high speed screw shaft 23 backwardly and through the driving member and planetary gearing and also concomitantly rotating the low speed screw shaft 17 backwardly. The high and low speed clutch nuts are prevented from rotating backwardly by their frictional connection through the retarders 58 and 67 thus they are threaded on their respective screw shafts away from the hub clutch surfaces. The backward rotation also indexes the indexing and selector mechanisms in such a way as to cause an aligning of the members to allow on future forward rotation the threading of the high speed clutch nut into driving engagement with the hub clutch surface 33. Upon subsequent forward rotation of the driving member the high speed clutch nut is permitted by the indexing and selector mechanisms to engage and drive the hub at the same speed as the driving member. Since the high speed clutch nut is traversed at a higher rate of speed, it will engage the hub prior to any engagement of the hub by the low speed clutch nut. Once the high speed clutch nut has drivingly engaged the hub clutch surface 33 the hub will overrun the low speed clutch nut and intermittently cause the clutch surfaces 19 and 21 to engage. This intermittent engagement will propel the low speed clutch nut towards the braking position counteracting its axial movement resulting from its being threadedly traversed towards driving engagement along the rotating low speed screw shaft. This hub overrunning thus causes a spacial separation to exist between the low speed clutch nut conical driving surface 19 and the clutch surface 21 which prevents it from effectively drivingly engaging the hub.

When the clutch nuts are rotated by their respective screw shafts, their rotational rates will, of course, be different resulting in a rotational difference. Since the clutch nuts are coupled together, this rotational difference must be effectively dissipated. Dissipation of the differential is accomplished through the high speed coupling member 63 and the high speed retarder 67. The coupler aperture 69 will engage the retarder extremity 68 and tend towards unwinding the retarder 67. This unwinding releases the frictional engagement between the retarder and groove 62 thereby allowing for temporary rotation equalization. This equalization or dissipation can occur whenever necessary and is an inherent automatic operation. It will be noted that rotational differences will always be dissipated by the high speed retarder regardless of direction of rotation.

In the event the operator desires to operate the brakes, he merely pedals backwardly an amount sufficient to cause the low speed clutch nut to traverse the low speed screw shaft in a backwardly direction and cause the dentil surface 71 of the low speed clutch nut to engage the dentil surface 72 of the brake pressure ring 48 pilot portion 51. The backward rotation of the low speed screw shaft causes the clutch nut 18 to engage and operate the brake pressure ring 48 and compress the brake discs 47. The dentils 71 and 72 provided therebetween effectively prevent relative rotation when the engagement between the clutch nut and brake pressure ring occurs.

The high speed screw shaft also rotates backwardly during brake operation and, consequently, the high speed clutch nut will also be traversed along its screw shaft. This traversal will be at a faster rate than that of the low speed clutch nut due to the greater rotational rate of the high speed screw shaft and because of its faster thread lead. When the high speed clutch nut has been previously blocked from drivingly engaging the hub, it will be at its axially closest point to the low speed clutch nut. This closeness and the high rate of traversal can cause two possible conditions to occur during braking operation. The high speed coupling member can become wedged or jammed between the opposing faces of the clutch nuts or the axially extending arms 64 can project beyond the low speed clutch nut into abutting engagement with the pilot portion 51 of the brake pressure ring 48 to initiate braking operation before the low speed clutch nut is properly positioned with the dentils 71 engaging the dentils 72. In both instances the coupling member 63 and retarder 67 will function to prevent any binding or lockup. The coupling member aperture 69 will abut the retarder extremity 68 and because the retarder is bi-directionally actuatable, it will be unwound a slight degree to release the frictional engagement. The releasing of frictional engagement again will dissipate or allow any rotational differences necessary for proper brake operation. In the case of the abutting arms the retarder will slip off any differential allowing the low speed clutch nut to axially move into braking position after which it will exert the desired and necessary braking forces.

Should the hub be rolled backwards while the high speed clutch nut and hub are drivingly engaged, the low speed clutch nut will be resultingly threaded on its screw shaft towards braking engagement. This low speed clutch nut braking movement is, however, effectively limited by the engagement between the nut 18 and the lugs 66 and braking cannot be accomplished until the high speed clutch nut relinquishes its driving engagement.

In Figure 4 of the drawing there is illustrated an embodiment of the invention wherein the retarder spring members are provided with substantially radially extending extremities 73 in place of the tangential extremities 59 or 68. The remaining parts are the same as the embodiment first described and are similarly numbered. The operation of this embodiment is the same as above described.

Although certain structures have been shown and described in detail, it will be understood that changes may be made in the design and arrangement of parts without departing from the spirit of the invention.

I claim:
1. In a two-speed hub and brake for velocipedes and the like: a stationary axle; a hub mounted on the axle having a plurality of clutch surfaces; brake means interengaging the hub and the axle for braking hub rotation; a first screw shaft journalled on the axle; a first clutch nut threaded on the first screw shaft for alternative movement into driving engagement with one of the hub clutch surfaces and into braking engagement with the brake means; a second screw shaft rotatably mounted on the first screw shaft; a second clutch nut threaded on the second screw shaft for movement into engagement with other of the hub clutch surfaces; driving means for rotating both screw shafts at different speeds; a first coupling member rotatably journalled on the brake means having a splined connection with the first clutch nut; a first retarder member journalled on the brake means and cooperating with the first coupling member to frictionally resist rotation of the first coupling member; a second coupling member rotatably journalled on second clutch nut having a splined connection with the first clutch nut; a second retarder member journalled on second clutch nut and cooperating with the second coupling member to frictionally resist rotation of the second clutch nut; and, alternatively controllable means for preventing the second clutch nut from engaging said other hub clutch nut surfaces.

2. A device as set forth in claim 1 in which the brake means includes a brake pressure ring slidably but non-rotatably mounted on the axle, said brake pressure ring including an axially extending pilot portion for rotatably journalling said first coupling member; cylindrical track means formed on the pilot portion for limiting the axial movement of the first retarder member; said first retarder member engaging the track means and having the extremities thereof freely cooperating with said first coupling member whereby said first retarder member frictionally resists rotation of said first coupling member relative to said brake means.

3. A device as set forth in claim 2 in which the second clutch nut includes an axially extending pilot portion for rotatably journalling the second coupling member; cylindrical track means formed on the pilot portion of the second clutch nut for limiting the axial movement of the second retarder means; said second retarder means engaging the track means and having the extremities thereof freely cooperating with said second coupling member whereby said second retarder member frictionally resists rotation of said second clutch nut relative to said second coupling member.

4. A device as set forth in claim 3 in which the retarder members comprise wrap-down helical spring members having at least one coil thereof contractively encompassing said pilot portions to provide normal frictional engagement therewith, the extremities of the spring member extending tangentially in opposite directions to provide the connection with said coupling members, said tangential connection being subject to bi-directional actuation in an unwinding direction by said coupling members to diminish the extent of the frictional engagement thereby allowing relative rotation between the coupled elements.

5. A device as set forth in claim 4 in which the coupling members include lost motion connections to said tangential retarder extremities, said lost motion connections comprising circumferentially spaced apertures of sufficient circumferential extent to prevent wind-down of a coupling member on one of the extremities of a co-acting retarder member during actuation of the other retarder extremity.

6. A device as set forth in claim 3 in which the retarder member comprises wrap-down helical spring members having at least one coil thereof contractively encompassing said pilot portions to provide normal frictional engagement therewith; the extremities of the spring member extending substantially radially outward to provide the connection with said coupling members, said radial connections being subject to bi-directional actuation in an unwinding direction by said coupling members to diminish the extent of the frictional engagement thereby allowing relative rotation between the coupling elements.

7. A device as set forth in claim 6 in which the coupling members include lost motion connections to said radial extremities, said lost motion connections comprising circumferentially spaced apertures of sufficient circumferential extent to prevent wind-down of a coupling member on one of the extremities of a coacting retarder member during actuation of the other retarder extremity.

8. A device as set forth in claim 1 including further means on said second coupling member for preventing braking movement by said first clutch nut when said second clutch nut is in engagement with the hub, in which said means comprising means for limiting the axial separation between said clutch nuts.

9. A device as set forth in claim 1 in which the retarder members comprise torque transmitting helical coil spring members, said spring members having the extremities thereof extending freely therefrom to provide the cooperative engagement with said coupling members.

10. The torque transmitting helical coil spring member set forth in claim 9 characterized by the fact that the coils thereof contractively encircle the journalling means to provide a normal frictional engagement therewith; and, further characterized by the fact that the extremities thereof are subject to bi-directional actuation in an expanding direction by said coupling members whereby the frictional engagement is diminished to allow for relative rotation between coupled elements.

11. In a two-speed hub and brake for velocipedes and the like: a fixed axle; a hub rotatably mounted relative to the axle having a first clutch surface and a second clutch surface; brake means including a brake pressure ring interengaging the hub and axle; a first screw shaft journalled on the axle; a first clutch nut threaded on said first screw shaft for movement by forward rotation of said first screw shaft into engagement with the said first clutch surface and by backward rotation of said first screw shaft into engagement with said brake pressure ring; a second screw shaft rotatably mounted on said first screw shaft; a second clutch nut threaded on said second screw shaft for movement by forward rotation of said second screw shaft into engagement with said second clutch surface; a driving member; means for rotating both screw shafts at different speeds from the driving member; a first coupling member rotatably supported on said brake pressure ring having a splined connection with said first clutch nut; a first retarder member journalled on said brake pressure ring and engaging said first coupling member for frictionally resisting rotation of said first coupling member; a second coupling member rotatably supported on said second clutch nut having a splined connection with said first clutch nut; a second retarder member journalled on said second clutch nut and engaging said second coupling member for frictionally resisting rotation of said second clutch nut; and, manually controllable means for preventing said second clutch nut from engaging said second clutch surface.

12. A device as set forth in claim 11 in which the retarder members comprise torque transmitting helical spring members, said spring members having at least one coil thereof encircling portions of the journalling means of the supporting elements, the extremities of said spring members extending freely therefrom to provide the engagement with said coupling members.

13. The torque transmitting helical coil spring member set forth in claim 12 characterized by the fact that the coils thereof contractively encircle the journalling means to provide normal frictional engagement therewith; and further characterized by the fact that the extremities thereof are subject to bi-directional actuation in an expanding direction by said coupling members whereby the frictional engagement is diminished to allow relative rotation between coupling elements.

14. In a two-speed hub and brake for velocipedes and the like: a fixed axle; a hub rotatably mounted relative to the axle and having on its interior a low speed clutch surface and a high speed clutch surface; brake means including a brake pressure ring interengaging the hub and axle; a low speed screw shaft journalled on the axle; a low speed clutch nut threaded on the low speed screw shaft for movement by forward rotation of the low speed shaft towards driving engagement with the hub low speed clutch surface and by backward rotation of the low speed screw shaft into engagement with the brake pressure ring for brake actuation; a high speed screw shaft rotatably mounted on the low speed screw shaft; a high speed clutch nut threaded on the high speed screw shaft for movement by forward rotation of the high speed screw shaft towards driving engagement with the hub high speed clutch surface; driving means; reduction gearing for rotating both screw shafts from the driving means at different speeds; said brake pressure ring having an axially extending pilot portion; cylindrical track means on said pilot portion; a first coupling member rotatably supported on said pilot portion having a splined driving connection with the low speed clutch nut; a first bi-directional actuated wrap-down helical spring retarder member journalled in said track means and having the extremities thereof engageable with the first coupling member for frictionally resisting rotation of said clutch nuts; said high speed clutch nut having an axially extending pilot portion; cylindrical track means on said high speed clutch nut pilot portion; a second coupling member rotatably supported on said high speed clutch nut pilot portion having a splined connection with the low speed clutch nut; a second bi-directional actuated wrap-down helical spring retarder member journalled in said high speed clutch nut track and having the extremities thereof engageable with the second coupling member for frictionally resisting rotation of said high speed clutch nut; means on the second coupling member preventing braking engagement of the low speed clutch nut when the high speed clutch nut is in engagement with the hub; and, manually alternatively controllable means for preventing the high speed clutch nut from engaging said hub high speed clutch surface.

15. In a two-speed hub and brake for bicycles: an axle; a hub journalled on the axle having interior clutch surfaces; brake means interengaging the hub and axle; a low speed screw shaft journalled on the axle; low speed clutch means including a low speed clutch nut threaded on the low speed screw shaft for alternatively drivingly engaging a hub clutch surface and actuating the brake means; a high speed screw shaft journalled on the low speed screw shaft; high speed clutch means including a high speed clutch nut threaded on the high speed screw shaft for drivingly engaging other of said hub clutch surfaces; means for rotating said shafts at different speeds; a first helical coil spring retarder journalled on the axle and cooperating with the low speed clutch means to frictionally but yieldably oppose rotation of said low speed clutch means whereby forward rotation of the low speed screw shaft causes driving engagement between the low speed clutch nut and a hub clutch surface and backward rotation causes braking engagement between the low speed clutch nut and brake means; a second helical coil spring retarder journalled on the high speed clutch nut and cooperating with the high speed clutch means to frictionally but yieldably oppose rotation of said high speed clutch nut whereby forward rotation of the high speed screw shaft causes high speed clutch nut movement towards driving engagement with other hub clutch surfaces; and, manually controllable means for preventing the high speed clutch nut from drivingly engaging the hub.

References Cited in the file of this patent

UNITED STATES PATENTS

| | | |
|---|---|---|
| 2,742,124 | Hood | Apr. 17, 1956 |
| 2,865,478 | Hood | Dec. 23, 1958 |
| 2,940,339 | Hood | June 14, 1960 |
| 2,944,443 | Spencer | July 12, 1960 |